US012714215B2

(12) United States Patent
Durrant et al.

(10) Patent No.: US 12,714,215 B2
(45) Date of Patent: Aug. 25, 2026

(54) HAIR STYLING APPLIANCE

(71) Applicant: Dyson Technology Limited, Wiltshire (GB)

(72) Inventors: James Michael Crosby Durrant, Swindon (GB); Gavin John Galligan, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 111 days.

(21) Appl. No.: 18/572,519

(22) PCT Filed: May 25, 2022

(86) PCT No.: PCT/GB2022/051321
§ 371 (c)(1),
(2) Date: Dec. 20, 2023

(87) PCT Pub. No.: WO2022/269227
PCT Pub. Date: Dec. 29, 2022

(65) Prior Publication Data

US 2024/0365942 A1 Nov. 7, 2024

(30) Foreign Application Priority Data

Jun. 24, 2021 (GB) ..................................... 2109088

(51) Int. Cl.
*A45D 20/10* (2006.01)
*A45D 1/06* (2006.01)
(Continued)

(52) U.S. Cl.
CPC ............ *A45D 2/001* (2013.01); *A45D 20/10* (2013.01); *A45D 20/12* (2013.01); *H05B 3/06* (2013.01)

(58) Field of Classification Search
None
See application file for complete search history.

(56) References Cited

U.S. PATENT DOCUMENTS 3,816,706 A 6/1974 Meywald
3,860,789 A * 1/1975 Maake .................. F24H 1/103 219/400

(Continued)

FOREIGN PATENT DOCUMENTS

CN 211794787 U 10/2020
DE 2522322 A1 12/1976

(Continued)

OTHER PUBLICATIONS

International Search Report and Written Opinion received for PCT Patent Application No. PCT/GB2022/051321, mailed on Aug. 25, 2022, 9 pages.

(Continued)

*Primary Examiner* — Tatiana L Nobrega
(74) *Attorney, Agent, or Firm* — Tucker Ellis LLP

(57) ABSTRACT

A hair styling appliance has first and second arms coupled together for reciprocal movement towards and away from each other, and arranged to receive hair within a region between each other. A plenum is disposed within at least one of the first arm and the second arm, the plenum including an air inlet for receiving airflow from a fan unit and an air outlet for emitting airflow towards hair within the region. A heater is disposed adjacent the air outlet for heating the airflow before it is emitted, wherein the heater includes a heating element that extends repeatedly across a heating region.

19 Claims, 11 Drawing Sheets

(51) Int. Cl.

| | |
|---|---|
| ***A45D 2/00*** | (2006.01) |
| ***A45D 20/12*** | (2006.01) |
| ***H05B 3/06*** | (2006.01) |

(56) References Cited

U.S. PATENT DOCUMENTS

| | | | | |
|---|---|---|---|---|
| 4,114,022 | A | 9/1978 | Braulke | |
| 4,225,775 | A | 9/1980 | Carter | |
| 5,334,818 | A | 8/1994 | Edwards et al. | |
| 2010/0270287 | A1* | 10/2010 | Lollar ...................... | H05B 3/06 219/536 |
| 2013/0247407 | A1 | 9/2013 | Richmond et al. | |
| 2015/0021314 | A1 | 1/2015 | Coulton et al. | |
| 2018/0146762 | A1* | 5/2018 | French-Jackson ..... | A45D 20/10 |
| 2022/0160092 | A1 | 5/2022 | Beaumont et al. | |
| 2022/0183438 | A1 | 6/2022 | Beaumont et al. | |

FOREIGN PATENT DOCUMENTS

| | | | |
|---|---|---|---|
| DE | 19510300 | C1 | 7/1996 |
| DE | 202005021917 | U1 | 5/2011 |
| EP | 1947908 | A1 | 7/2008 |
| EP | 3373699 | A1 | 9/2018 |
| GB | 1100823 | A | 1/1968 |
| GB | 2516249 | A | 1/2015 |
| GB | 2582558 | A | 9/2020 |
| GB | 2582559 | A | 9/2020 |
| JP | 59-171504 | A | 9/1984 |

OTHER PUBLICATIONS

Search Report received for GB Application No. 2106251.8, mailed on Dec. 9, 2021, 2 pages.

* cited by examiner

HAIR STYLING APPLIANCE

CROSS-REFERENCE TO PRIOR APPLICATION

This application is a § 371 National Stage Application of PCT International Application No. PCT/GB2022/051321 filed May 25, 2022, which claims the priority of United Kingdom Application No. 2109088.1, filed Jun. 24, 2021, each of which are herein incorporated by reference in their entirety.

FIELD

The present invention relates to a hair styling appliance.

BACKGROUND

Heated hair styling appliances are designed to use the action of heat, mechanical means and/or airflow to form hair into a desired shape or style.

A hair straightener can utilise heated plates attached to pivoted arms that can be held, by a user, in a closed position with a tress of hair clamped between the heated plates. The tress of hair can be styled into a changed shape once the hair is heated above a transition temperature.

SUMMARY

According to an aspect, there is provided a hair styling appliance comprising:

- a first arm and a second arm coupled together for reciprocal movement towards and away from each other, and arranged to receive hair within a region between each other;
- a plenum disposed within at least one of the first arm and the second arm, the plenum comprising an air inlet for receiving airflow from a fan unit and an air outlet for emitting airflow towards hair within the region; and
- a heater disposed adjacent the air outlet for heating the airflow before it is emitted, wherein the heater comprises a heating element that extends repeatedly across a heating region.

The use of such a heater may provide a compact, high density option for heating air in such an application.

The heater may comprise a frame that supports the heating element. The frame may include a first pair of frame elements, the first pair of frame elements being spaced apart in a direction generally normal to the airflow. Optionally, the frame elements may be disposed generally parallel to each other.

The frame elements may extend in a direction generally normal to the airflow.

The heating element may extend repeatedly between the frame elements.

The heating region may comprise a first upstream heating region defined by the heating element passing repeatedly from a first of the frame elements to a second of the frame elements, and a first downstream heating region defined by the heating element passing repeatedly from the second frame element to the first frame element.

The hair styling appliance may comprise a second pair of the spaced apart frame elements disposed upstream of the first pair of spaced apart frame elements, the heating region comprising a further upstream heating region defined by the heating element passing from a third of the frame elements to a second of the spaced apart frame elements, and a further downstream heating region defined by the heating element passing from the second frame element to the first frame element.

The or each of the heating elements may be wound around the or each pair of frame elements.

The or each pair of the frame elements may be separated by one or more spacers. For example, the one or more spacers may extend between mutually opposing surfaces of the frame elements of the or each pair of the frame elements.

Where there are two pairs of the frame elements, the one or more spacers of the first pair of the frame elements may be laterally offset from the one or more spacers of the second pair of the frame elements relative to the downstream direction.

BRIEF DESCRIPTION OF DRAWINGS

In order that the present invention may be more readily understood, embodiments of the invention will now be described, by way of example, with reference to the accompanying drawings, in which.

DETAILED DESCRIPTION

Figure 5:
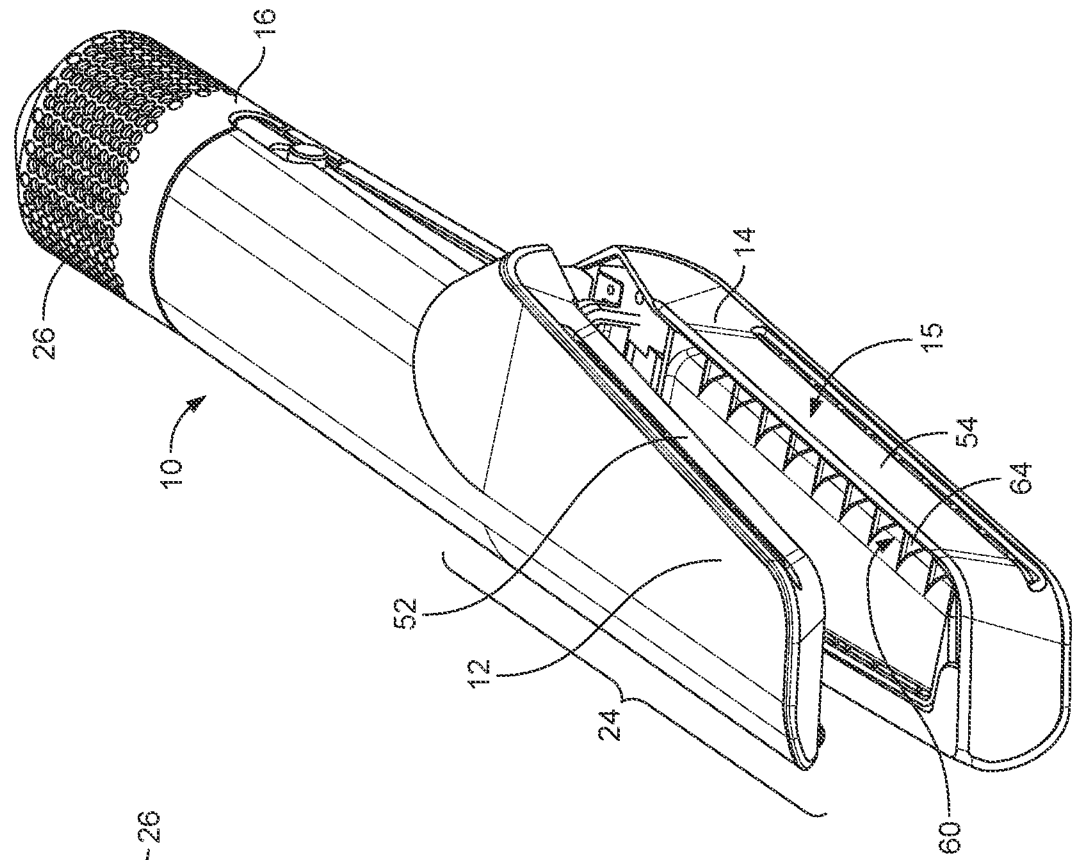
FIG. 5 is a perspective view of the hair styling appliance of FIG. 1 in an open position.
Figure 4:
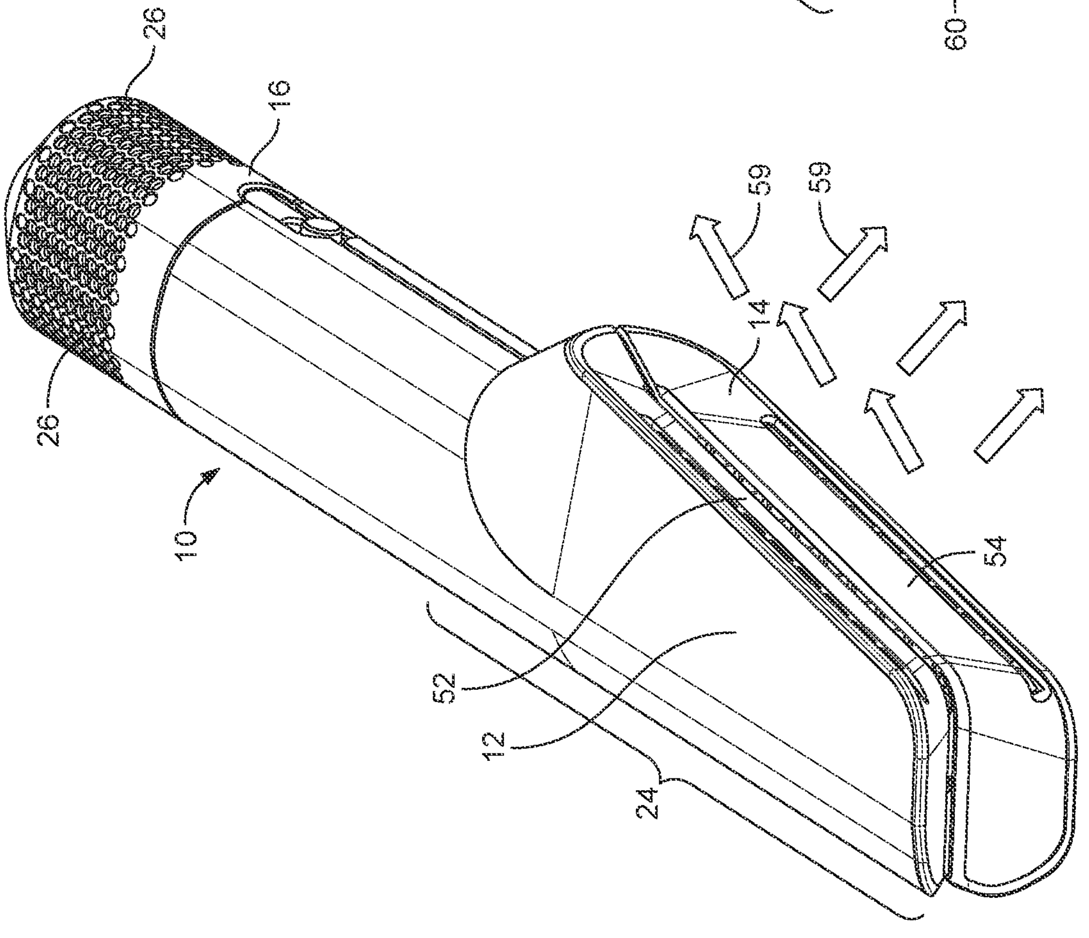
FIG. 4 is a perspective view of the hair styling appliance of FIG. 1 in a closed position.

Referring to the drawings, a hair styling appliance 10 comprises a first arm 12 and a second arm 14 coupled together for reciprocal movement towards and away from each other. In the illustrated example, first arm 12 and second arm 14 are pivotably mounted to a base in the form of a handle section 16, by way of respective hinges 17. First and second arms 12 and 14 are biased by springs (not shown) towards the open position, as shown in FIG. 5, and can be manually closed against the bias of the springs by a user.

Each of first arm 12 and second arm 14 terminates at a tip region 18 distal to handle section 16. Each of first and second arms 12 and 14 includes, in plan, a tapered portion 24 that narrows along its length towards tip region 18.

First and second arms 12 and 14 are arranged to receive hair within a region in the form of drying cavity 20. Drying cavity 20 is a space between first and second arms 12 and 14 within which a hair tress 22 is captured when the hair styling appliance 10 is in use, as described in more detail below.

Each of first and second arms 12 and 14 comprises a leading edge 15, past which hair enters drying cavity 20 while the hair is being pulled through the hair styling appliance 10 in use. Each of first and second arms 12 and 14 also comprises a trailing edge 19, past which hair leaves drying cavity 20 while the hair is being pulled through the hair styling appliance 10 in use.

The section of handle section 16 distal to tip region 18 is generally hollow, and includes several external holes 26 through which air passes when hair styling appliance 10 is in use. A filter 28 filters incoming air to remove dust and other particles that might damage downstream components or a user's hair.

Once through filter 28, air continues downstream through an impeller 30 that is driven by an electric motor 32. Motor 32 may be driven by a mains power supply (supplied via a cable, not shown) and/or batteries (not shown), depending upon implementation.

Figure 12:
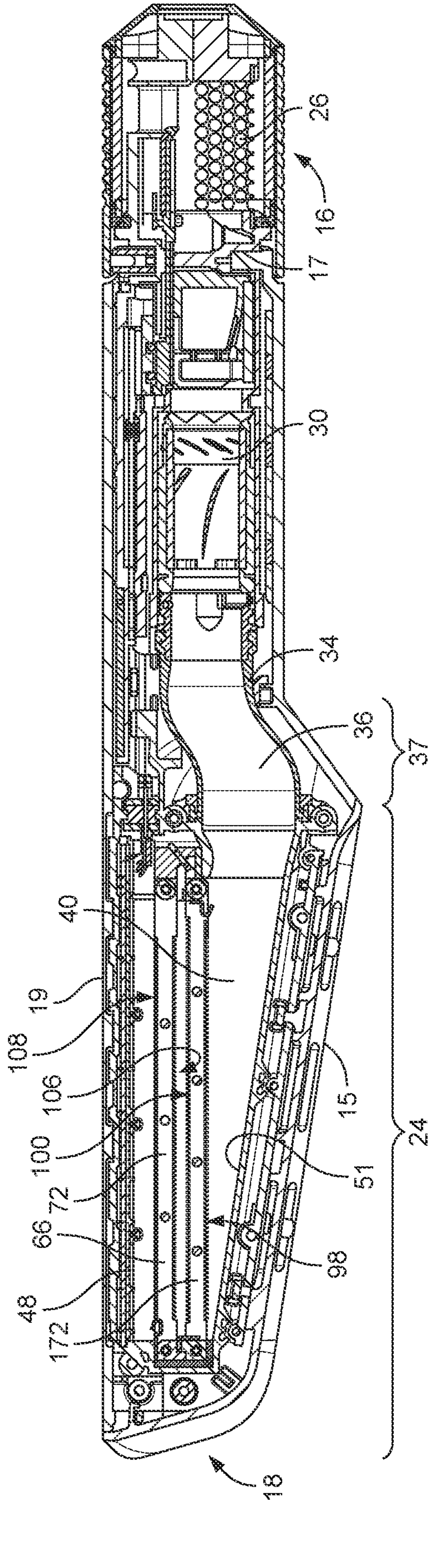
FIG. 12 is a longitudinal horizontal sectional view of the hair styling appliance of FIGS. 1 to 6, taken through FIG. 4.

Downstream of motor 32, air continues through a bellows 34. Bellows 34 forks, dividing air into first and second ducts 36 and 38. Each of first and second ducts 36 and 38 includes an offset, in the form of an S-shaped portion 37 as shown in FIG. 12. Alternatively, an offset, such as an S-shaped portion, may be provided upstream of where the bellows fork.

In yet another alternative, an offset, such as an S-shaped portion, may be provided in the airflow path at a similar position where only a single plenum is provided, and hence there is no need for a fork or, at least in some cases, bellows.

First duct 36 feeds air into a first plenum 40 within first arm 12 via a first air inlet 42, and second duct 38 feeds air into a second plenum 44 within second arm 14 via a second air inlet 46. Bellows 34 is at least partly formed from a resilient material, allowing the first and second ducts to bend away from each other when the hair styling appliance is in the open position shown in FIG. 5.

First plenum 40 has an outlet in the form of a first slot 48 that opens into drying cavity 20. Similarly, second plenum 44 has an outlet in the form of a second slot 50 that opens into drying cavity 20. First slot 48 and second slot 50 extend along an inner face of respective first and second arms 12 and 14. First and second slots 48 and 50 take the form of continuous apertures in the hair styling appliance 10, but may alternatively take the form of one or more discontinuous and/or differently shaped apertures disposed along drying cavity 20.

First slot 48 and second slot 50 are disposed closer to their respective trailing edges 19 than their respective leading edges 15.

Each of first and second plenums 40 and 44 includes a longitudinally extending heater 66 for heating the airflow before it is emitted from respective first and second slots 48 and 50. Heater 66 is described in more detail below with reference to FIGS. 13 to 15.

As best shown in FIG. 12, each of first and second plenums 40 and 44 tapers, in plan, towards tip region 18 from where it joins its corresponding duct 36/38. This decrease in transverse cross-sectional area of the first and second plenums 40 and 44 compensates for a gradual reduction in air pressure due to increasing distance from motor 32. S-shaped portion 37 directs airflow into a region of each plenum at point distal to the first and second slots 48 and 50, which helps even out the pressure across the length of first and second plenums 40 and 44.

An angled wall 51 within each plenum extends along most of the plenum's length. The angle of angled wall 51 relative to the corresponding slot 48 or 50 is selected such that air is evenly redirected from the plenum through slot 48 or 50. An angle of around 6-10 degrees, more particularly around 8-9 degrees, and most particularly 8.7 degrees has been found to be effective in at least the embodiment of FIGS. 1-6.

First arm 12 includes a first air deflector 52 and second arm 14 includes a second air deflector 54. First air deflector 52 and second air deflector 54 are disposed along the first arm 12 and second arm 14, respectively, and are configured to deflect at least some of the airflow away from the hair within drying cavity 20, as described in more detail below. First air deflector 52 and second air deflector 54 are disposed closer to their respective leading edges 15 than to their trailing edges 19.

In hair styling appliance 10, first air deflector 52 partly defines a first duct 56. First duct 56 is also partly defined by a first outer surface 58 of first arm 12 disposed opposite first air deflector 52. Similarly, second air deflector 54 defines a second duct 60. Second duct 60 is similarly partly defined by a second outer surface 62 of second arm 14 disposed opposite second air deflector 54.

First and second outer surfaces 58 and 62 curve, in transverse cross-section, away from drying cavity 20. As well as giving offering a smooth path for airflow 59 passing through first and second ducts 56 and 60, the curve of first and second outer surfaces 58 and 62 is selected to encourage airflow attachment, thereby encouraging the airflow into the ducts and reducing restriction.

Figure 1:
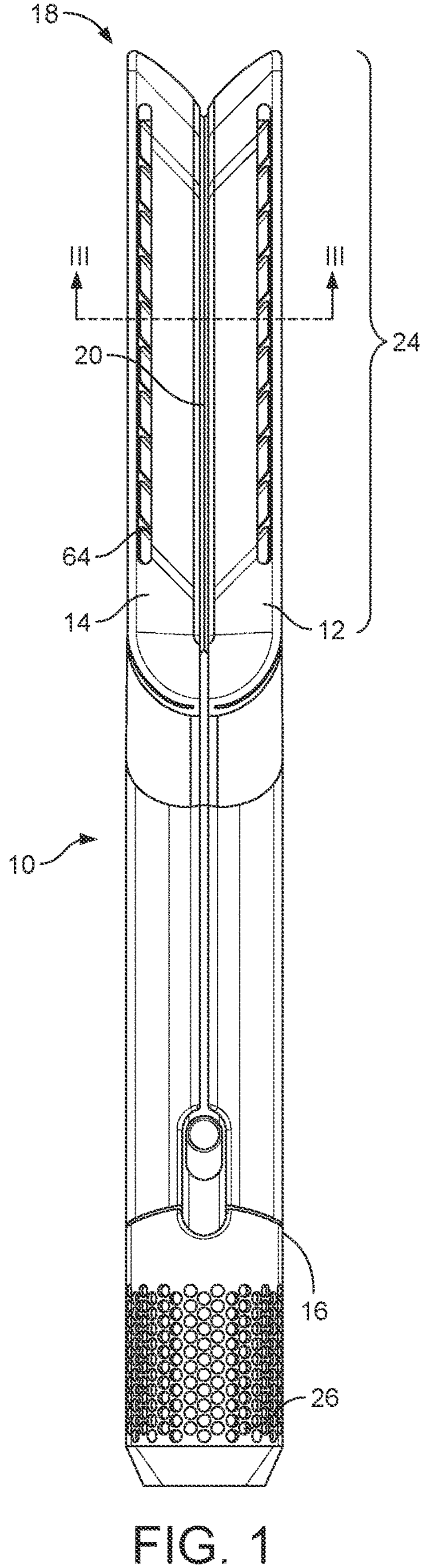
FIG. 1 is a side elevation of a hair styling appliance.
Figure 2:
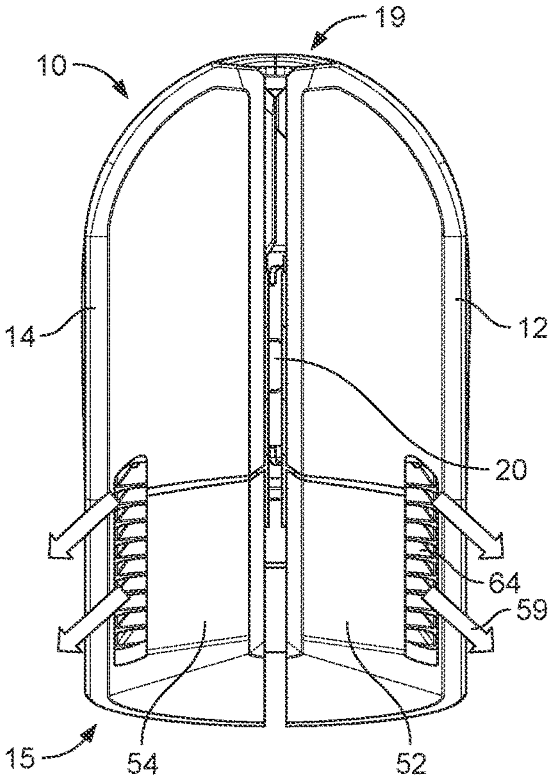
FIG. 2 is an end elevation of the hair styling appliance of FIG. 1.
Figure 3:
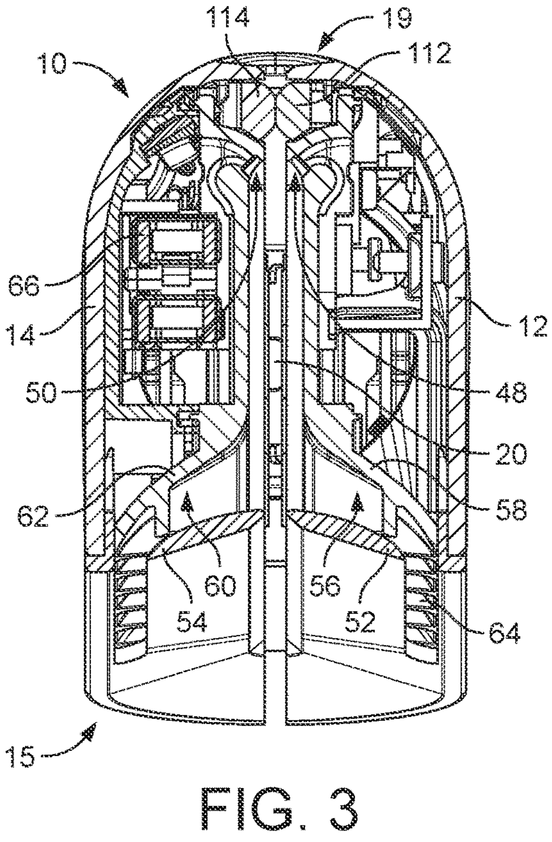
FIG. 3 is a cross-section through line III-III of the hair styling appliance of FIG. 1.
Figure 6:
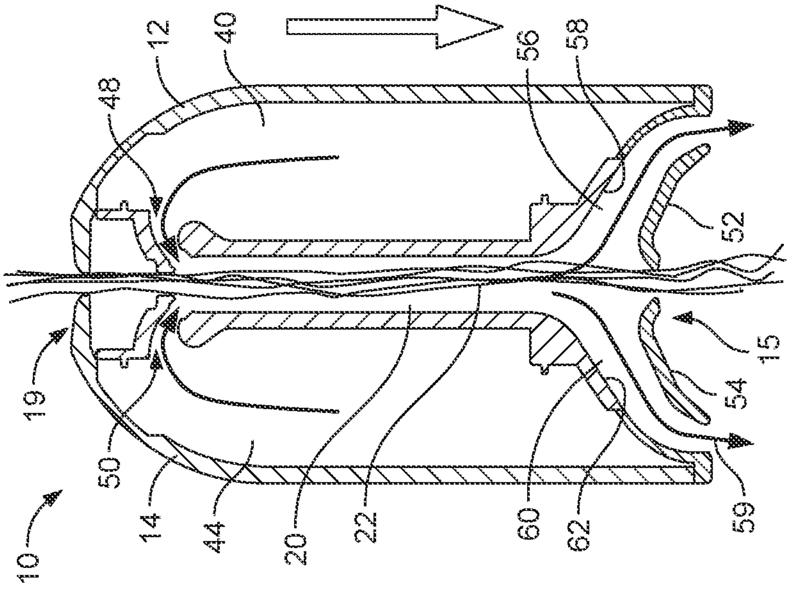
FIG. 6 is a simplified version of the cross section of FIG. 3.

As best shown in FIGS. 3 and 6, first and second ducts 56 and 60 curve away from drying cavity 20 along at least a portion of their respective lengths. In hair styling appliance 10, first and second ducts 56 and 60 curve away in transverse cross-section (see FIGS. 3 and 6). This encourages airflow 59 away from hair within drying cavity 20.

First and second ducts 56 and 60 converge, in transverse cross-section, in a downstream direction. This accelerates airflow 59 as it leaves first and second ducts 56 and 60, which assists with air entrainment, which in turn acts to reduce the average temperature of the moving air. Reduced air temperature can offer greater user comfort, depending on the orientation with which hair styling appliance 10 is used.

First and second ducts 56 and 60 include a plurality of vanes 64, disposed between their outer surfaces 58 and 62 and air deflectors 52 and 54. Each vane 64 is angled and curved relative to a longitudinal axis of first and second arms 12 and 14, so as to deflect airflow exiting first and second ducts 56 and 60, in use, generally towards tip region 18 of hair styling appliance 10. Deflecting the airflow in this manner may improve user comfort, depending on the orientation with which hair styling appliance 10 is used.

In use, while hair styling appliance 10 is in the open position shown in FIG. 5, a user places the hair tress 22 between first and second arms 12 and 14, within drying cavity 20. Typically, hair styling appliance 10 is positioned with trailing edge 19 close to the user's scalp but other positions may be selected depended upon the desired styling effect. The user then squeezes first and second arms 12 and 14 together towards the closed position shown in FIG. 4, thereby capturing the hair tress 22 within drying cavity 20.

Driven by motor 32, impeller 30 draws air through holes 26 and filter 28, then impels it downstream through bellows 34, where it is divided between first and second ducts 36 and 38. Airflow enters first plenum 40 from first duct 36 and second plenum 44 from second duct 38.

Airflow moves through first and second plenums 40 and 44, and towards respective heaters 66. The airflow is heated by heaters 66, and then exits first and second slots 48 and 50 into drying cavity 20. Due to the tapered transverse cross-section of first and second plenums 40 and 44, and S-shaped portion 37, the heated airflow exits first and second slots 48 and 50 generally evenly along their lengths.

While the user draws hair styling appliance 10 away from the scalp, the heated airflow heats and dries hair tress 22 within drying cavity 20, straightening and smoothing it. As the heated airflow leaves hair tress 22, the majority of it is directed into first and second ducts 56 and 58, although a small amount may leak through hair trapped in the gap between internal edges of first and second air deflectors 52 and 54. The airflow is directed away from hair tress 22 through first and second ducts 56 and 60, and ejected at an angle as described in more detail above.

Although hair styling appliance 10 shows both of first and second arms 12 and 14 having a plenum, outlet and air deflector, other combinations of these features may be used.

In an example, only one of first and second arms 12 and 14 includes a plenum and only one of first and second arms 12 and 14 includes an air deflector. The arm with the plenum need not be the same as the arm with the air deflector.

Figure 7:
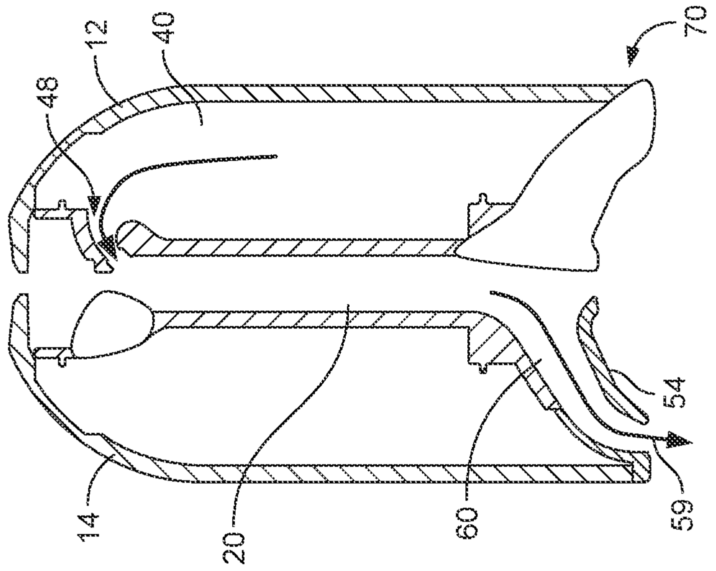
FIG. 7 is a simplified cross-section of an alternative hair styling appliance.

For example, FIG. 7 shows a transverse cross-section of a hair styling appliance 70, in which features in common with hair styling appliance 10 use the same reference signs. In hair styling appliance 70, second arm 14 does not include a plenum. Also, first arm 12 does not include an air deflector. As such, all of the airflow exiting drying cavity 20 passes through duct 60.

Figure 8:
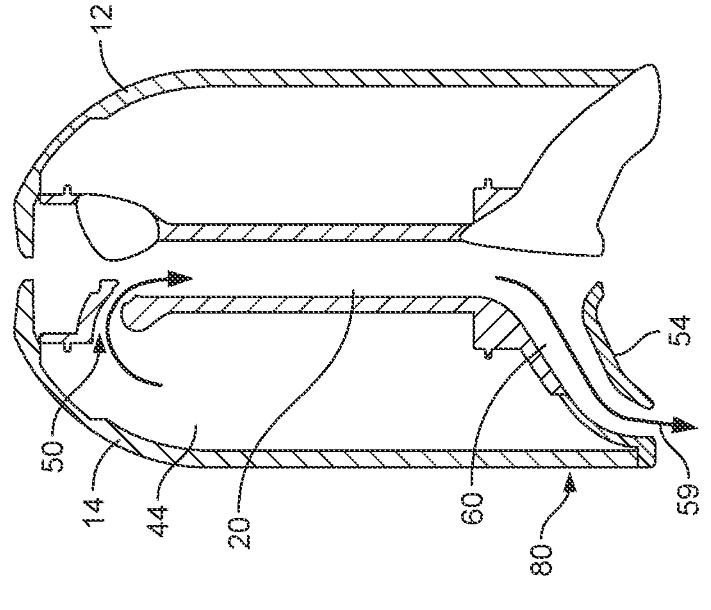
FIG. 8 is a simplified cross-section of a further alternative hair styling appliance.
Figure 11:
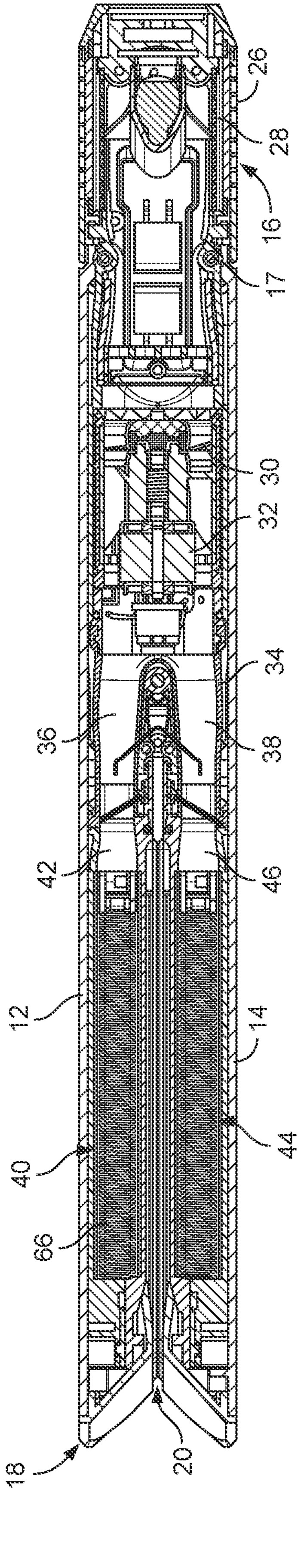
FIG. 11 is a longitudinal vertical sectional view of the hair styling appliance of FIGS. 1 to 6, taken through FIG. 4.

FIG. 8 shows a transverse cross-section of a hair styling appliance 80, in which features in common with hair styling appliances 10 and 60 use the same reference signs. In hair styling appliance 80, second arm 14 includes plenum 44 and duct 60, but first arm 12 includes neither a plenum nor an air deflector. As with hair styling appliance 60, all of the airflow exiting drying cavity 20 passes through duct 60, although in this case, the airflow is supplied into drying cavity 20 via second slot 50.

In another example, both of first and second arms 12 and 14 include a plenum but only one of first and second arms 12 and 14 includes an air deflector.

Figure 9:
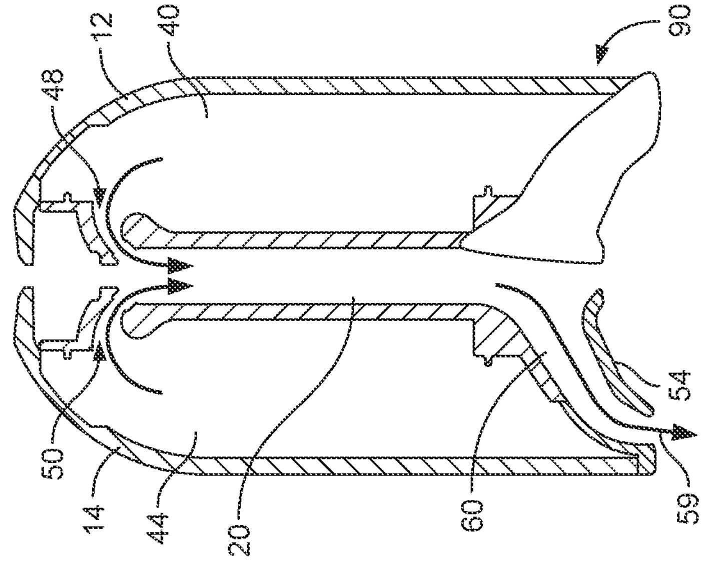
FIG. 9 is a simplified cross-section of a further alternative hair styling appliance.

For example, FIG. 9 shows a transverse cross-section of a hair styling appliance 90, in which features in common with hair styling appliances 10, 70, and 80 use the same reference signs. In hair styling appliance 90, first and second arms 12 and 14 include respective first and second plenums 40 and 44. Second arm 14 includes air deflector 54, but first arm 12 does not include an air deflector. As such, all of the airflow exiting drying cavity passes through second duct 60.

In another example, only one of first and second arms 12 and 14 includes a plenum, but both of first and second arms 12 and 14 include an air deflector.

Figure 10:
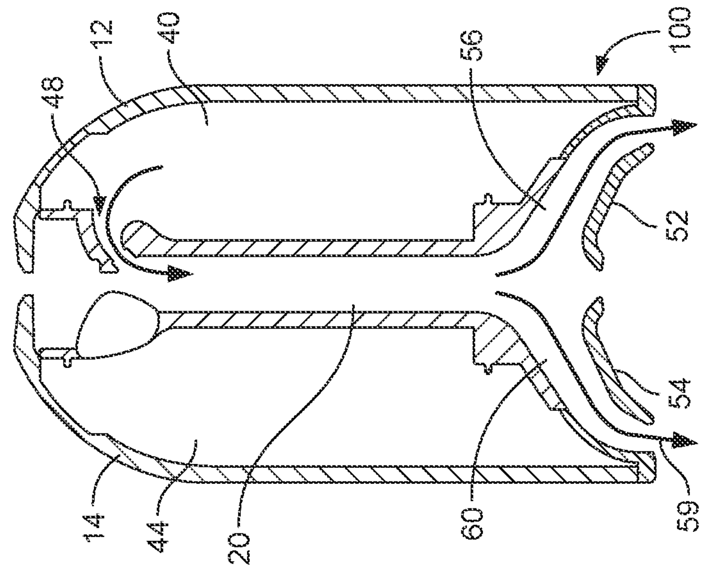
FIG. 10 is a simplified cross-section of a further alternative hair styling appliance.

For example, FIG. 10 shows a transverse cross-section of a hair styling appliance 100, in which features in common with hair styling appliances 10, 70, 80, and 90 use the same reference signs. In hair styling appliance 100, first arm 12 includes first plenum 40, but second arm 14 does not include a plenum. As such, airflow exiting drying cavity 20 passes through first and second ducts 56 and 60 in a similar manner to that described in relation to hair styling appliance 10 of FIGS. 1-6, although in this case, the airflow is supplied into drying cavity 20 only via first slot 48.

It will be appreciated that, although specific combinations of first and second arms, plenums, outlets and air deflectors have been described, any other combination of such components may be adopted, depending upon the desired implementation. Selecting a particular combination of these elements may allow a manufacturer to balance manufacturing costs against desired performance.

In addition, although the use of a single motor 32 and impeller 30 has been described, it will be appreciated that a separate motor can be provided in or for each arm.

Also, although the hair styling appliances described above all use a base (such as handle section 16), the skilled person will appreciate that the arms may be directly connected to each other, rather than via such a base. In that case, motor 32 and impeller 30 can be mounted within one of the arms, or a separate motor and impeller can be mounted within each of the arms.

Although first and second arms 12 and 14 are generally symmetrical, the skilled person will appreciate that this need not be the case. For example, one of the arms may have greater volume than the other, and may contain, for example, motor 32, impeller 30, and a plenum, while the other arm may not contain those items. An air deflector can be in mounted on either of the arms in this approach.

Although the air deflectors described above take the form of linear elements that define a longitudinal duct, in other embodiments, a different form of air deflector may be used. For example, the air deflector(s) can take the form of one or more apertures formed through either or both of the arms. In that case, the air deflectors form part of a wall of each aperture upon which air exiting drying cavity 20 impinges and is redirected. Alternatively, the air deflector(s) can take the form of one or more longitudinal slats spaced from either or both of the arms.

Heater 66 may take any suitable form. Both first and second plenums 40 and 44 include heaters, but to avoid duplication, only that within first plenum 40 will be described. The skilled person will appreciate that, in other implementations, only one of the plenums has a heater. Also, where both plenums have heaters, they need not be the same as each other.

Figure 13:
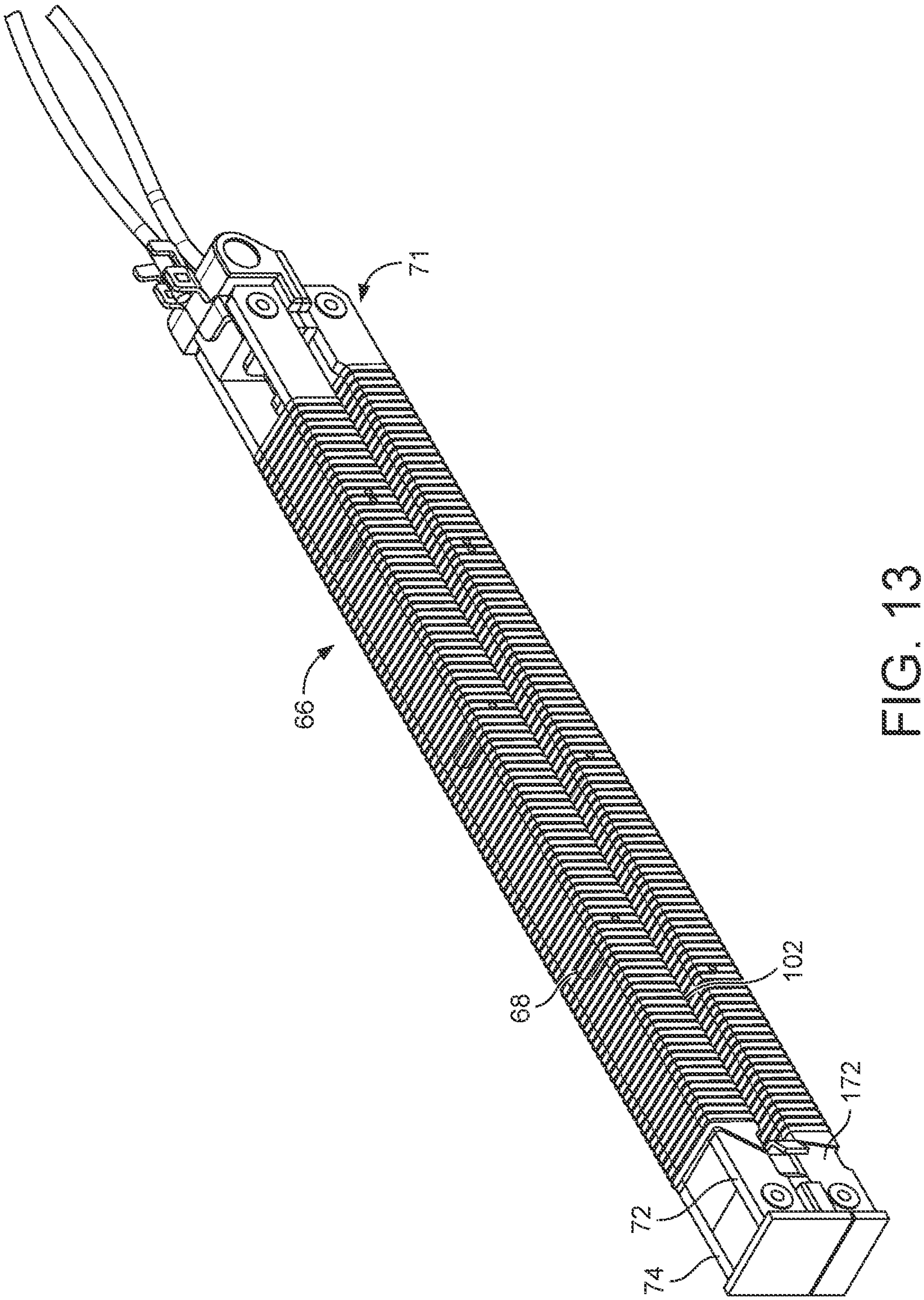
FIG. 13 is a perspective view of a heater for use with a hair styling appliance such as that of FIGS. 1 to 6.
Figure 14:
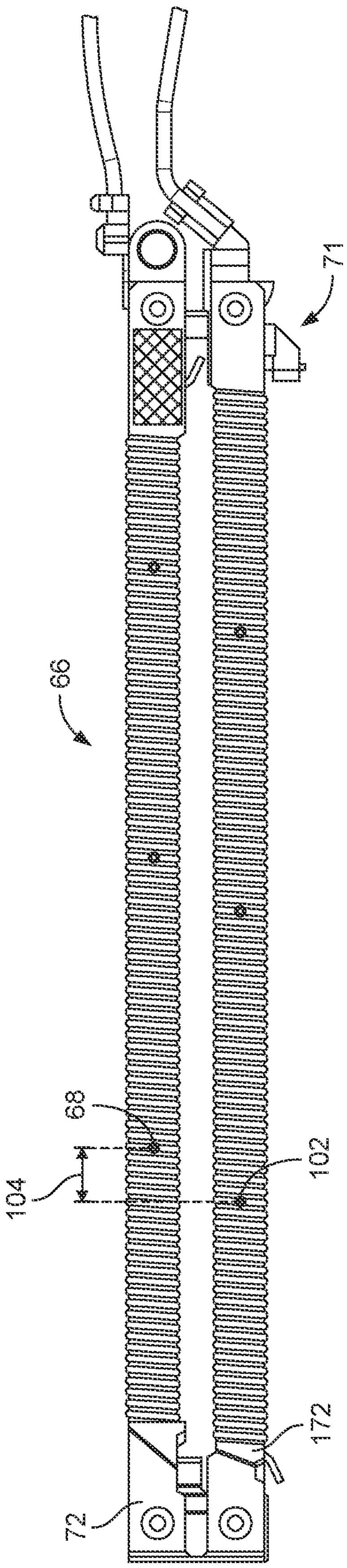
FIG. 14 is a top view of the heater of FIG. 13.
Figure 15:
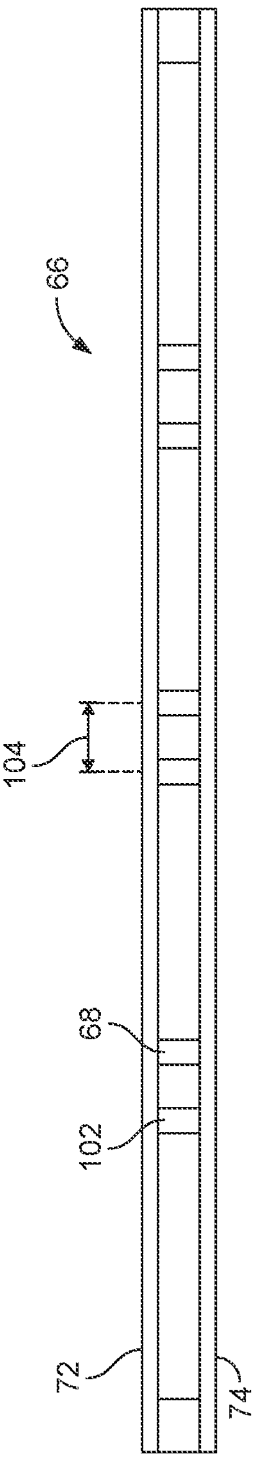
FIG. 15 is a front elevation of the heater of FIGS. 13 and 14.

In the illustrated example, and as best shown in FIGS. 13 to 15, heater 66 comprises a frame 71. Frame 71 includes a first pair of frame elements 72 and 74, which are spaced apart in a direction generally normal to the airflow. The frame elements 72 and 74 extend in a direction generally normal to the airflow, and are disposed generally parallel to each other, although this need not be the case. Frame elements are formed from mica, although any other suitable heat-resistant material may be used.

Frame elements 72 and 74 are held apart from each other by spacers 68. In this case, each spacer is cylindrical and formed from mica, although any other suitable heat-resistant material may be used. Other cross-sectional shapes may also be employed, dependent upon the requirements of any specific implementation. Spacers 68 extend between mutually opposing surfaces of the frame elements 72 and 74.

In the illustrated embodiment, there is a second set of frame elements 172 and 174, spaced apart from each other in a direction parallel to the airflow by further spacers 102. The second set of frame elements 172 and 174 are spaced from the first set of frame elements 72 and 74 in an upstream direction.

As best shown in FIGS. 12 and 13, spacers 68 and further spacers 102 are laterally offset 104 from each other relative to the downstream direction. Offset 104 ensures that air disrupted by further spacers 102 is not significantly further disrupted by downstream spacers 68, as would be the case if spacers 68 were directly in line with further spacers 102. This results in a more even distribution of air and heat into drying cavity 20.

A heater used with the hair styling appliance can comprise one or more heating elements. In the illustrated embodiment, pair of frame elements 72 and 74, and pair of further frame elements 172 and 174, each has wound around it a heating element 66, such that heating element 66 extends repeatedly across a heating region. Heating element 66 in this case takes the form of nichrome wire, although other materials and heating element types may be used.

In the illustrated implementation, the heating region comprises a first upstream heating region 98 defined by heating element 66 passing repeatedly from frame element 172 to frame element 174, and a first downstream heating region 100 defined by heating element 66 passing repeatedly from frame element 174 to frame element 172. By passing repeatedly between frame elements 172 and 174 in this manner, heating element 66 densely covers the region through which air flows when hair styling appliance 10 is in use.

In other implementations, the heating element can extend repeatedly across a space or spaces between frame elements 172 and 174, and can be retained in place with clamps, screws or any other suitable retaining means. Alternatively, or in addition, the heating element can be held in place by notches or holes in frame elements 172 and 174. Tension of the heating element may optionally help hold it in place.

The heating element can take any other suitable form, including resistive tape, traces, wire, or the like, and can optionally include corrugations, castellations, undulations, fins, or the like, to cover an increased area and improve heat transfer.

Frame elements 72 and 74 similarly include a heating region comprising a further upstream heating region 106 and a further downstream region 108, defined by the heating element passing from one frame element to another frame element in a similar fashion to that described for frame elements 172 and 174.

Turning to FIGS. 16 to 19, there are shown a number of configurations of a hair styling appliance, in which common features are referred to with like reference signs. These configurations are schematic and exemplary only, and the skilled person will appreciate that many other configurations and arrangements may be employed.

The hair styling appliances of FIGS. 16 to 19 each has a plurality of elements moveable relative to each other. The plurality of elements comprises the first arm 12 and the second arm 14.

Figure 16:
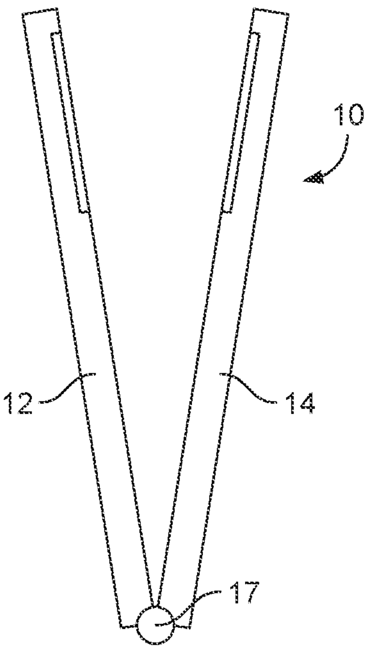
FIG. 16 is a schematic side view of a hair styling appliance.

In FIG. 16, first arm 12 and second arm 14 are mounted to pivot about hinge 17. There are no further major elements associated with the mechanism for allowing the first and second arms 12 and 14 to pivot relative to each other about the hinge axis defined by hinge 17.

Figure 17:
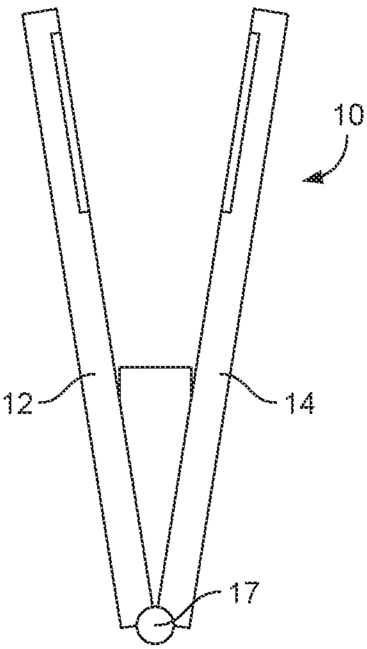
FIG. 17 is a schematic side view of a further hair styling appliance.

In FIG. 17, as well as first and second arms 12 and 14, there is provided a base 16. In this case, base 16 is nested between first and second arms 12 and 14, such that when first and second arms 12 and 14 are pushed together, base 16 is enclosed between them. In other embodiments, base 16 may be disposed differently relative to first and second arms, such as partly being outside one or both of the first and second arms, for example.

Figure 18:
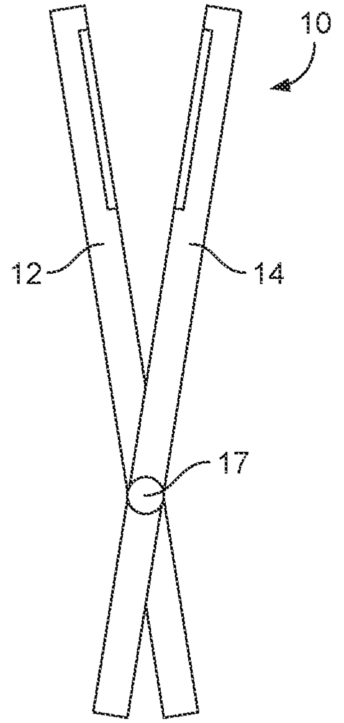
FIG. 18 is a schematic side view of a further hair styling appliance.

In FIG. 18, first and second arms 12 and 14 extend downwards beyond hinge 17 to form a scissor-type arrangement.

Figure 19:
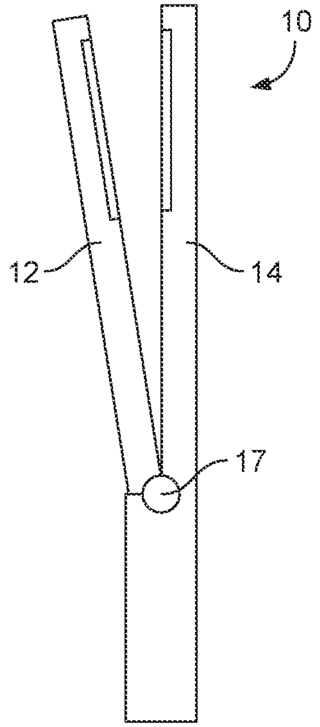
FIG. 19 is a schematic side view of a further hair styling appliance.

In FIG. 19, base 16 is an integral part of second arm 14, while first arm 12 pivots relative to second arm 14 and base 16 about the hinge axis of hinge 17.

It will be appreciated that the hair styling appliance can take many other general forms and configurations. For example, instead of hinge, a flexible spring, and/or an articulated arrangement allowing for relative movement between the first and second arms may be employed.

Turning to FIGS. 20 to 23, there are shown examples of hair styling appliances that use a sensor arrangement to allow the sensing of relative movement between at least two elements of the hair styling appliance. The relative movement may be, for example, an angle and/or a distance between two such elements. The two elements between which relative movement, an angle or distance is sensed may be the first and second arms 12 and 14, or one of the arms and another element of the hair styling appliance. For example, where a base 16 is employed, relative movement, an angle and/or distance may be sensed between the base 16 and one of the first and second arms 12 and 14.

To enable sensing of the relative movement, angle and/or distance between at least two elements of the hair styling appliance, there is provided a sensor arrangement comprising at least a first sensor component mounted to at least one of the elements. Where a single sensor component is used, it is mounted to one element of the hair styling appliance, and measures relative movement, a distance and/or angle between it and another element of the hair styling appliance.

Any suitable sensor based on mechanical, electromechanical, electronic, capacitive, inductive, magnetic, sonic, electromagnetic, or any other technology may be employed in such a sensor arrangement. Alternatively, first sensor component 76 may be a combined transmitter/receiver, such as an ultrasonic transmitter/receiver unit using the same transducer for transmission and receipt.

In the examples of FIGS. 20 to 23, the sensor arrangement comprises a first sensor component 76 and a second sensor component 78. First and second sensor components 76 and 78 may include any combination of sensors based on mechanical, electromechanical, electronic, capacitive, inductive, magnetic, sonic, electromagnetic, or any other technology. For example, first and second sensor components 76 and 78 can take the form of a complementary transmitter and receiver. For example, second sensor component 78 can be an ultrasonic transmitter, light emitter or magnetic field generator (such as a magnet), and first sensor component 76 is a complementary ultrasonic receiver, light receiver (such as a light dependent resistor, for example) or Hall effect sensor. Second sensor component 78 may alternatively or in addition take the form of a reflector, such as a mirror or acoustically reflective region, which may optionally be shaped to focus a reflected signal.

In other alternatives, first component 76 may take the form of a receiver, sensor, or scanner that interacts with a feature, aspect or characteristic of the second sensor component 78. For example, first component 76 may take the form of an image sensor, and second sensor component 78 may take the form of a target, reticle, scale or other formation that can be sensed by the image sensor to determine the distance or angle.

In yet other alternatives, first component 76 may take the form of a Hall-effect sensor, and second component 78 may take the form of a magnet. The Hall-effect sensor is configured to sense a position and/or orientation of the magnet, dependent upon the angle or distance between the respective elements to which the first and second components 76 and 78 are mounted.

In yet other embodiments, either or both of first and second sensor components 76 and 78 can include one or more mechanical elements, components, linkages, and/or mechanisms that allow an angle or distance to be measured, whether in relative or absolute terms. For example, a mechanism can be provided to convert relative movement between first and second arms 12 and 14 into rotary motion, which can be sensed using a rotary encoder. Alternatively, or in addition, the first and/or second sensor component 76 and 78 can include one or more variable resistors, capacitors, inductors, switches, or combinations thereof. The first and/or second component can also comprise an interacting component that interacts with elements of the one or more variable resistors, capacitors, inductors, switches, or combinations thereof.

First sensor component 76 outputs a first signal indicative of an angle and/or distance between first arm 12 and second arm 14 based on the sensed angle and/or distance. In this context, the term "indicative of an angle and/or distance" does not require the signal to directly or explicitly encode an angle and/or distance. For example, the first signal may indirectly or implicitly indicate a distance between the first and second sensor components. Although the first signal is therefore "indicative" of the distance and, implicitly, the angle between the first and second arms 12 and 14, the signal need not be converted into an actual distance or angle. Instead, whatever value is carried by the first signal may be used directly as an input, without conversion into any other form.

Similarly, although the distance and angle between elements of the hair styling appliance are described as being alternatives to each other, in practice, neither a distance nor an angle need explicitly be sensed or determined. For example, if first sensor component 76 is an ultrasonic receiver, and second sensor component 78 is an ultrasonic transmitter, the first signal can represent the time taken for the ultrasonic signal generated by second component 78 to reach first sensor component 76. While the time is indicative of the distance traversed by the ultrasonic signal, it need not be necessary to convert the time into a distance and/or angle.

It can also be sufficient to determine that some threshold has been met in terms of whatever value is sensed by first sensor component 76, irrespective of whether that threshold is ever converted to an actual distance or angle.

The first signal may be output to, for example, one or more processors, such as a microprocessor 82. Microprocessor 82 optionally conditions, amplifies, filters, or otherwise processes the first signal if necessary, and then uses it as an input for controlling hair styling appliance 10. Alternatively, processing circuitry (not shown) and/or the one or more processors may form part of the sensor arrangement that generates the first signal.

An action may be taken based on the first signal. For example, if the first signal indicates that the angle and/or distance between first and second arms 12 and 14 has fallen below a first threshold angle, microprocessor 82 may conclude that the user has squeezed a tress of hair 22 between first and second arms 12 and 14 within drying cavity 20. Microprocessor 82 will therefore turn on heater 66 and motor 32, in order to cause heated air to be ejected from first and second slots 48 and 52 to dry hair within drying cavity 20.

If the first signal indicates that the angle and/or distance between first and second arms 12 and 14 has subsequently increased above a second threshold angle, microprocessor 82 may conclude that the user has released the tress of hair 22. Microprocessor 82 will therefore turn off heater 66 and motor 32, such that heated air is no longer ejected from first and second slots 48 and 52. Alternatively, only heater 66 is turned off, and motor 32 is left running for at least some period of time after the second threshold angle is exceeded. This may reduce, for example, intermittent switching on and off of fan motor 32, which may be distracting for a user, and may result in increased wear on parts within haircare appliance 10.

Optionally, or alternatively, the fan may be controlled based on the position of the arms. For example, instead of turning off the motor 32 and/or heater 66 in response to the second threshold being met, the motor power may be reduced, slowing the airflow to conserve power and reduce the amount of air exiting the device when a tress 22 is not being squeezed in drying cavity 20.

First and second threshold angles and/or distances may be the same. Alternatively, a hysteresis function may be applied such that the first threshold angle and/or distance is less than the second threshold angle and/or distance. This prevents, for example, rapid switching if the user maintains the first and second arms very close to a common threshold point.

Yet other thresholds may also be employed. For example, a third threshold intermediate the first and second threshold may be used, in which heater 66 is turned off while motor 32 is kept turned on, with both heater 66 and motor 32 being turned off as the second threshold is exceeded.

Microprocessor 82 may also accept user input, such as the status of a switch (not shown) operable by a user. For example, microprocessor 82 sensing that the first threshold angle and/or distance has been exceeded can turn on motor 32, while heater 66 may only be turned on by user pressing a switch.

Other combinations of thresholds, inputs and control may be implemented, depending upon the application.

The first signal may be indicative of the angle and/or distance between the first and second arms 12 and 14 by indicating a status relative to one or more thresholds. For example, the first signal may be a first voltage (e.g., 0V DC)

when the first and second arms are closed beyond a first threshold angle, and a second voltage (e.g., 12V) when the first and second arms are opened beyond a second threshold angle. Where the first and second threshold angles are different, such as where hysteresis is employed, the first sensor component 76 may include circuitry (not shown) that implements the hysteresis without the microprocessor 82 needing to be involved. Alternatively, the hysteresis may be implemented by the microprocessor based on the first signal.

Figure 20:
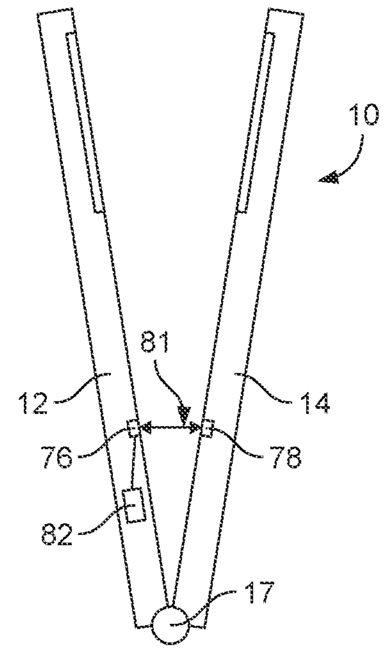
FIG. 20 is a schematic side view of the hair styling appliance of FIG. 16, showing a sensor arrangement for measuring a change in relative position between elements of the hair styling appliance.

FIG. 20 shows an arrangement in which first component 76 is mounted to first arm 12 and second component 78 is mounted to second arm 14. As the first and second arms 12 and 14 move closer to each other, the distance between first and second sensor components 76 and 78 reduces. First sensor component 76 senses a distance 81 between the first and second arms 12 and 14 using any suitable technology, such as any of those described above. First sensor component 76 then outputs a first signal indicative of an angle and/or distance between the first arm and the second arm based on the sensed angle and/or distance.

Figure 21:
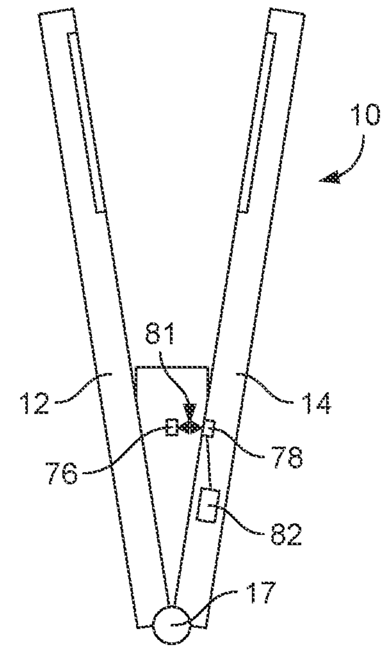
FIG. 21 is a schematic side view of the hair styling appliance of FIG. 17, showing a further sensor arrangement for measuring a change in relative position between elements of the hair styling appliance.

FIG. 21 shows an arrangement in which first component 76 is mounted to base 16, and second component 78 is mounted to second arm 14. In this arrangement, distance 81 is about half the distance 81 in the arrangement of Figure X5. Either the first signal itself is modified to take this into account, or the interpretation of the first signal by microprocessor 82 is correspondingly adjusted.

Figure 22:
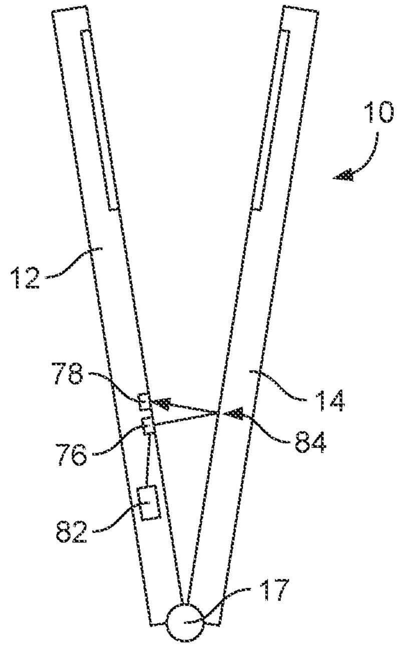
FIG. 22 is a schematic side view of the hair styling appliance of FIG. 16, showing a further sensor arrangement for measuring a change in relative position between elements of the hair styling appliance.

FIG. 22 shows an arrangement in which first component 76 and second component 78 are both mounted to first arm 12. Second component 78 is a transmitter, such as an ultrasonic transmitter or a light-emitting device, and first component 76 is a complementary receiver, such as an ultrasonic receiver or a light-dependent device. The signal output by second component 78 bounces off a section 84 of second arm 14, before being received by first component 76. In this arrangement, distance 81 is about twice the distance 81 in the arrangement of Figure X5. Either the first signal itself is modified to take this into account, or the interpretation of the first signal by first microprocessor 82 is correspondingly adjusted. Mounting both components on the same arm may simplify construction, especially where both components need wiring.

Figure 23:
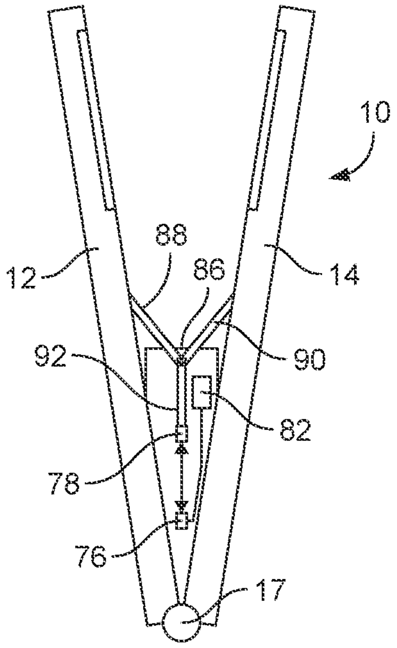
FIG. 23 is a schematic side view of the hair styling appliance of FIG. 17, showing a further sensor arrangement for measuring a change in relative position between elements of the hair styling appliance.
Figure 24:
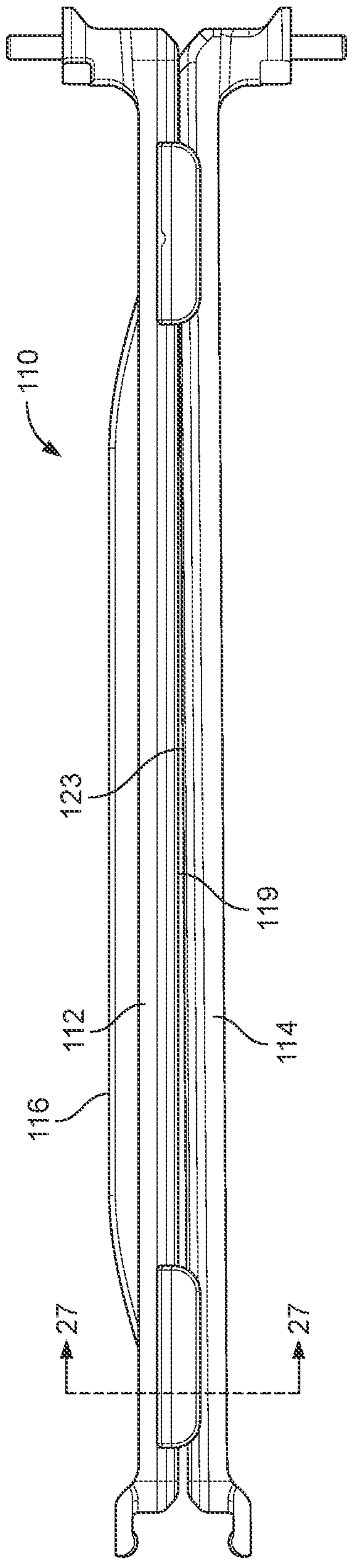
FIG. 24 is side elevation of a tension plate arrangement for use with a hair styling appliance.
Figure 25:
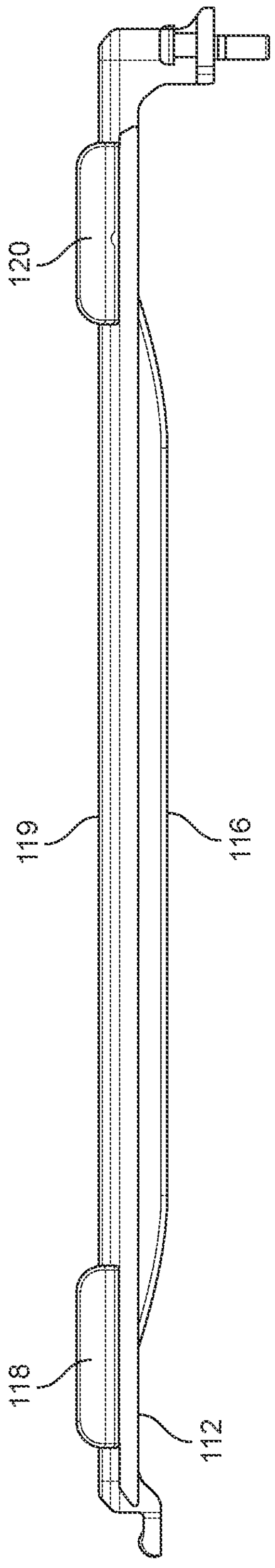
FIG. 25 is a side elevation of one of the tension plates from the tension plate arrangement of FIG. 24.

FIG. 23 shows an arrangement in which a linkage 86 is provided. Linkage 86 includes a first link 88 pivotably connected to first arm 12, a second link 90 pivotably connected to first link 88 and second arm 14, and a third link 92 connected to the junction between first link 88 and second link 90. Third link 92 is constrained by a complementary slot and tab arrangement (not shown) with 16, such that it slides upwards and downwards relative to base 16 as first and second arms 12 and 14 are moved apart and together. The relative lengths and general arrangement of linkage 86 can be selected to provide mechanical amplification of any movement between first and second arms 12 and 14. This may improve sensitivity and/or reliability of detection. It will be appreciated that any other suitable linkage may be used.

Any other arrangement or mechanism may be used for allowing the distance or angle between first and second arms 12 and 14 to be inferred.

In addition, where the distance or angle between the first and second arms 12 and 14 is not itself being measured due to the relative locations of the first and second sensor components 76 and 78, it may be sufficient to infer the distance or angle without expressly converting it to the actual distance or angle between the first and second arms 12 and 14. For example, in the hair styling appliance of FIG. 21, the distance being measured between first sensor component 76 and second sensor component 78 is actually about half that between the corresponding portions of the first and second arms 12 and 14. It is not necessary to expressly convert the measured distance between first sensor component 76 and second sensor component 78 into the actual distance between the corresponding portions of the first and second arms 12 and 14. Instead, the relationship between the distance or angle between the corresponding portions of the first and second arms 12 and 14 is inferred based on the known relationship between them and the first signal.

Turning to FIGS. 24-27, there is shown a tension plate arrangement 110 that extends along the trailing edges of first and second arms 12 and 14, upstream of slots 48 and 50. Tension plate arrangement 110 includes a first tension plate 112 and a second tension plate 114. First tension plate 112 is resiliently biased towards second tension plate 114 by a metal leaf spring 116. First tension plate 112 is mounted within a slot of first arm 12 such that it can move away from second tension plate 114 against the tension of spring 116 within the slot.

In the illustrated example, first tension plate 112 includes a first guide 118 at one end and a second guide 120 at the other end, with a first contact surface 119 extending between them. Second tension plate 114 includes a third guide 122 at one end and a fourth guide 124 at the other end, with a second contact surface 123 extending between them. First and second contact surfaces 119 and 123 are coated with a low-friction coating to reduce friction, although any other suitable material may be employed.

In the illustrated implementation, first, second, third, and fourth guides 118, 120, 122, and 124 take the form of tapered tongue-like projections made of an elastomeric material such as silicone that allows the guides to bend. First guide 118 and third guide 122 are positioned in line with each other, and second guide 120 and fourth guide 124 are also positioned in line with each other.

Figure 27:
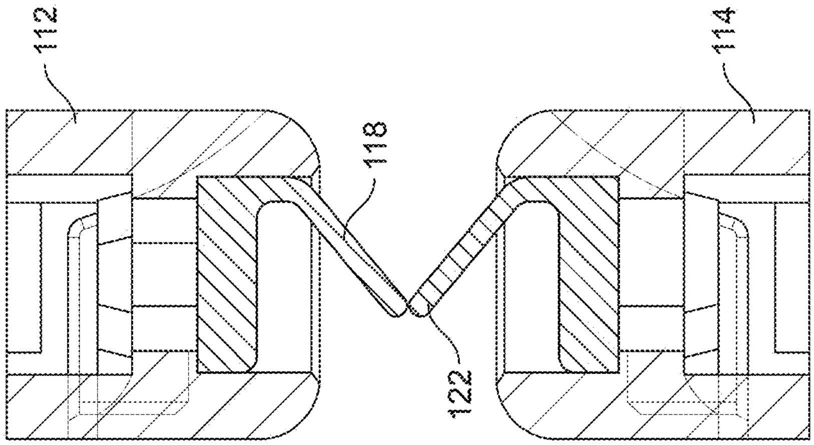
FIG. 27 is a cross-sectional view of the tension plate arrangement of FIG. 24.
Figure 26:
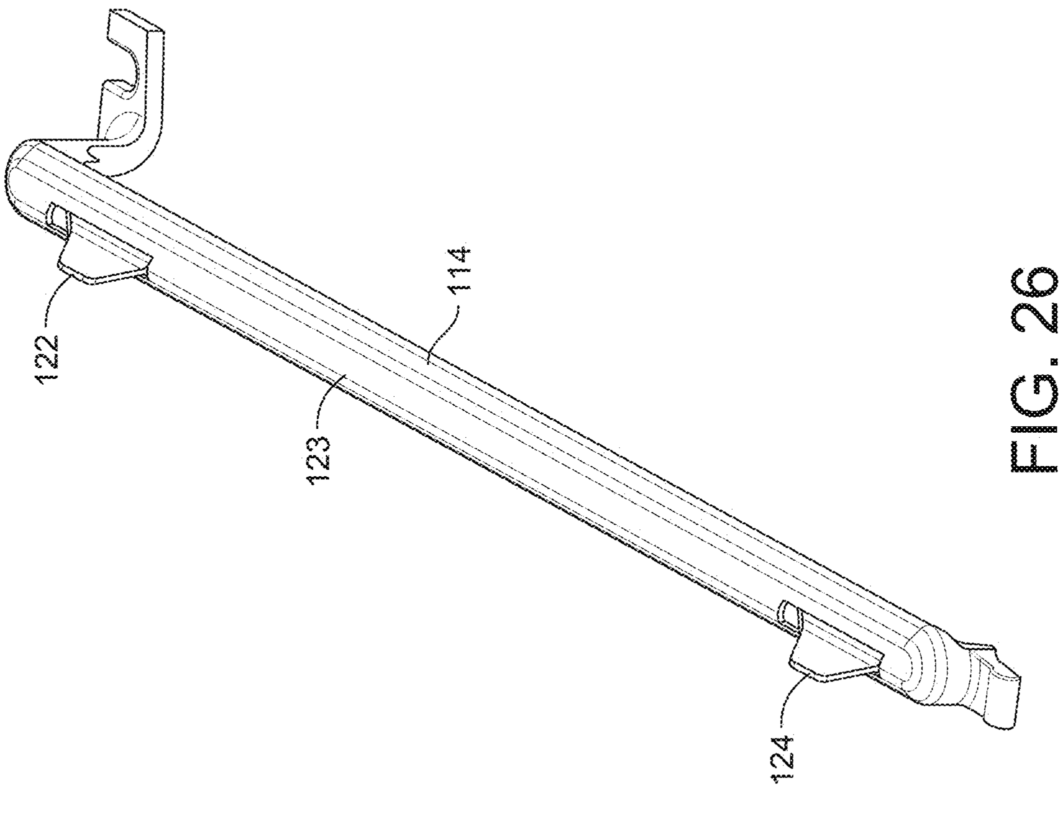
FIG. 26 is a perspective view of the other of the tension plates from the tension plate arrangement of FIG. 24.

In use, as first and second arms 12 and 14 are pushed together to trap tress 22 within drying region 20, opposing tips of first guide 118 and third guide 122, and second guide 120 and fourth guide 124, make contact with each other, and bend as shown in FIG. 27. Contact between the respective pairs of guides prevents hair from tress 22 from leaving the drying region 20, for example due to the force of airflow entering the drying region.

Further movement of first and second arms towards each other traps tress 22 between first and second contact surfaces 119 and 123, although pressure on tress 22 is limited by spring 116. As the user draws hair through hair styling appliance 10 by pulling it away from the scalp, the pressure on tress 22 caused by first and second contact surfaces 119 and 123 provides tactile feedback and helps smooth the heated hair as it leaves drying region 20.

Optionally, the haircare appliance may be used for drying hair like a conventional hairdryer. In such a mode (which may be automatic or manually selected), airflow 59 exiting ducts 56 and 60 can be used to dry a user's hair by directing it in the same way as air from a conventional hairdryer is used. This option may be useful for "rough drying" of the hair, to reduce moisture levels before the appliance is used in a subsequent styling operation.

Although several aspects have been described with reference to the accompanying drawings, the invention is not limited to those aspects.

The invention claimed is:

1. A hair styling appliance comprising:

a first arm and a second arm coupled together for reciprocal movement towards and away from each other, and arranged to receive hair within a region between each other;

a plenum disposed within at least one of the first arm and the second arm, the plenum comprising an air inlet for receiving airflow from a fan unit and an air outlet for emitting airflow towards hair within the region; and a heater disposed adjacent the air outlet for heating the airflow before it is emitted, wherein the heater comprises a frame that supports one or more heating elements that extend repeatedly across a heating region, wherein the frame includes a first pair of frame elements and a second pair of frame elements disposed upstream of the first pair of frame elements, wherein the one or more heating elements is repeatedly wound around at least one of the first pair of frame elements and/or the second pair of frame elements, wherein the frame elements of the first pair of frame elements are spaced apart from one another in a direction generally normal to the airflow and are separated from one another by one or more spacers, wherein the frame elements of the second pair of frame elements are spaced apart from one another in the direction generally normal to the airflow and are separated from one another by one or more spacers, and wherein a first frame element of the second pair of frame elements is arranged below a first frame element of the first pair of frame elements along the upstream direction, and the one or more spacers of the first pair of frame elements is laterally offset from the one or more spacers of the second pair of frame elements relative to a downstream direction.

2. The hair styling appliance of claim 1, wherein the frame elements of the first pair of frame elements are disposed generally parallel to each other.

3. The hair styling appliance of claim 1, wherein each frame element of the first pair of frame elements extend in the direction generally normal to the airflow.

4. The hair styling appliance of claim 1, wherein the one or more heating elements is repeatedly wound around the first pair of frame elements and is repeatedly wound around the second pair of frame elements, wherein the heating region comprises a first upstream heating region defined by the one or more heating elements passing repeatedly from the first frame element of the first pair of frame elements to a second frame element of the first pair of frame elements, and a first downstream heating region defined by the one or more heating elements passing repeatedly from the second frame element of the first pair of frame elements to the first frame element of the first pair of frame elements.

5. The hair styling appliance of claim 4, the heating region comprising a further upstream heating region defined by the one or more heating elements passing from the first frame element of the second pair of frame elements to a second frame element of the second pair of frame elements, and a further downstream heating region defined by the one or more heating elements passing from the second frame element of the second pair of frame elements to the first frame element of the second pair of frame elements.

6. The hair styling appliance of claim 1, wherein the one or more spacers of the first pair of frame elements extend between mutually opposing surfaces of the frame elements of the first pair of frame elements.

7. The hair styling appliance of claim 6, wherein the one or more heating elements is repeatedly wound around the first pair of frame elements and is repeatedly wound around the second pair of frame elements, wherein the heating region comprises a first upstream heating region defined by the one or more heating elements passing repeatedly from the first frame element of the first pair of frame elements to a second frame element of the first pair of frame elements, and a first downstream heating region defined by the one or more heating elements passing repeatedly from the second frame element of the first pair of frame elements to the first frame element of the first pair of frame elements.

8. The hair styling appliance of claim 1, wherein the frame elements of the second pair of frame elements are disposed generally parallel to each other.

9. The hair styling appliance of claim 1, wherein each frame element of the second pair of frame elements extends in a direction generally normal to the airflow.

10. The hair styling appliance of claim 1, wherein the one or more spacers of the second pair of frame elements extend between mutually opposing surfaces of the frame elements of the second pair of frame elements.

11. The hair styling appliance of claim 1, wherein a second frame element of the second pair of frame elements is arranged directly below a second frame element of the first pair of frame elements along the upstream direction.

12. The hair styling appliance of claim 1, wherein the first pair of frame elements, the one or more spacers of the first pair of frame elements, the second pair of frame elements, and the one or more spacers of the second pair of frame elements comprise a heat-resistant material.

13. The hair styling appliance of claim 1, wherein the one or more heating elements is repeatedly wound around the first pair of frame elements and is repeatedly wound around the second pair of frame elements.

14. The hair styling appliance of claim 1, wherein the one or more heating elements comprise a first heating element and a second heating element, wherein the first heating element is repeatedly wound around the first pair of frame elements, and wherein the second heating element is repeatedly wound around the second pair of frame elements.

15. The hair styling appliance of claim 1, wherein each frame element of the first and second pairs of frame elements comprise notches configured to hold the one or more heating elements on each frame element.

16. A hair styling appliance comprising:

a first arm and a second arm coupled together for reciprocal movement towards and away from each other, and arranged to receive hair within a region between each other;

a plenum disposed within at least one of the first arm and the second arm, the plenum comprising an air inlet for receiving airflow from a fan unit and an air outlet for emitting airflow towards hair within the region; and a heater disposed adjacent the air outlet for heating the airflow before it is emitted, wherein the heater comprises a frame that supports one or more heating elements that extend repeatedly across a heating region, wherein the frame includes a first pair of frame elements and a second pair of frame elements spaced apart from the first pair of frame elements in a direction of the airflow, wherein the one or more heating elements is repeatedly wound around at least one of the first pair of frame elements and/or around the second pair of frame elements, wherein a first frame element of the first pair of frame elements is spaced apart from a second frame element of the first pair of frame elements in a direction generally normal to the airflow, wherein a first frame element of the second pair of frame elements is spaced apart from a second frame element of the second pair of frame elements in the direction generally normal to the airflow, and wherein the first frame element of the first pair of frame elements is arranged directly above the first frame element of the second pair of frame elements along the direction of airflow.

17. The hair styling appliance of claim 16, wherein the second frame element of the first pair of frame elements is arranged directly above the second frame element of the second pair of frame elements along the direction of airflow.

18. The hair styling appliance of claim 16, wherein the one or more heating elements comprise a first heating element and a second heating element, wherein the first heating element is repeatedly wound around the first pair of frame elements, and wherein the second heating element is repeatedly wound around the second pair of frame elements.

19. The hair styling appliance of claim 16, wherein the first frame element of the first pair of frame elements is disposed parallel to the second frame element of the first pair of frame elements; and wherein the first frame element of the second pair of frame elements is disposed parallel to the second frame element of the second pair of frame elements.

* * * * *